June 22, 1937.  A. Y. DODGE  2,084,388

BRAKE

Filed April 23, 1931

INVENTOR.
ADIEL Y. DODGE
BY
*Jn. W. McConkey*
ATTORNEY.

Patented June 22, 1937

2,084,388

UNITED STATES PATENT OFFICE 2,084,388

BRAKE

Adiel Y. Dodge, South Bend, Ind., assignor to Bendix Brake Company, South Bend, Ind., a corporation of Illinois Application April 23, 1931, Serial No. 532,298

9 Claims. (Cl. 188—152)

This invention relates to brakes, and is illustrated as embodied in an internal expanding automobile brake of a novel shiftable-anchorage type. An object of the invention is to arrange a brake of this type for actuation by hydraulic or other fluid pressure operating means.

Preferably there are two shoes, each anchoring at one end when the drum is turning in one direction and at the other end when the drum is turning in the other direction, and two fluid-pressure applying devices are arranged to act on the shoes adjacent their ends. In the illustrated embodiment, the fluid pressure devices act as brake anchorages as well as to apply the brake; for example the operating pistons may have parts shouldered to engage the ends of the cylinders and transmit the braking torque thereto.

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the brake shoes in side elevation;

Figure 2:
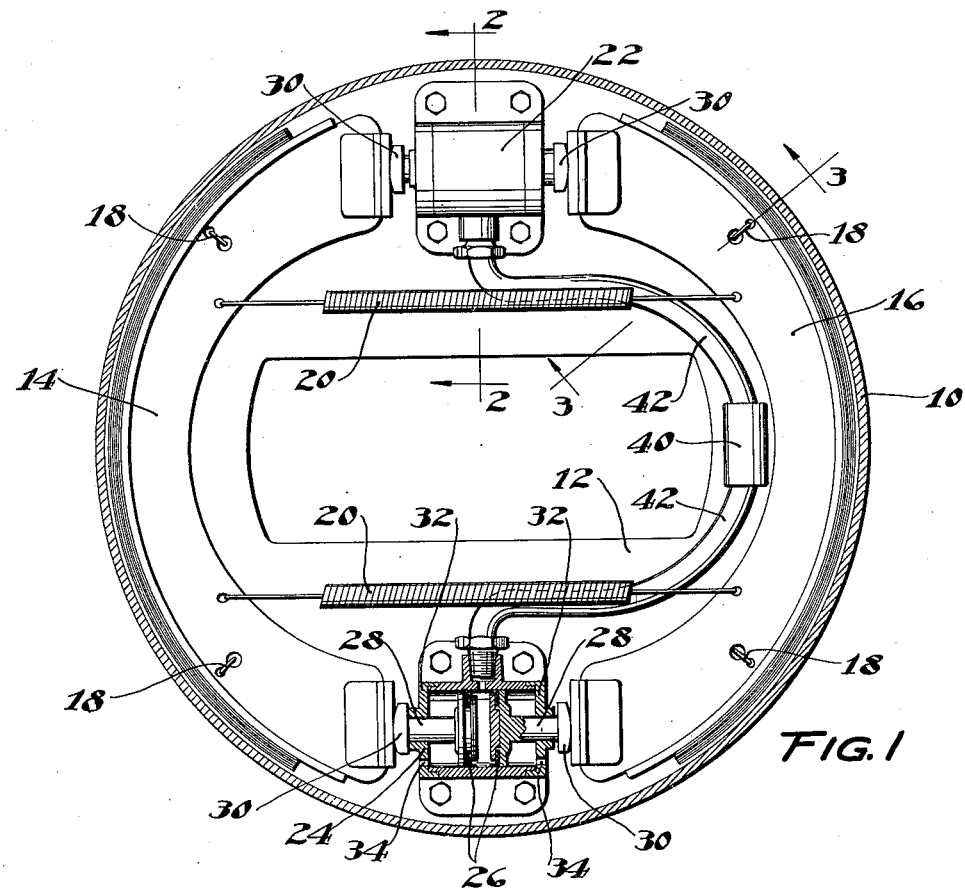
Figure 2 is a section on the line 2—2 of Figure 1, showing the mounting of one of the fluid-pressure cylinders.
Figure 3:
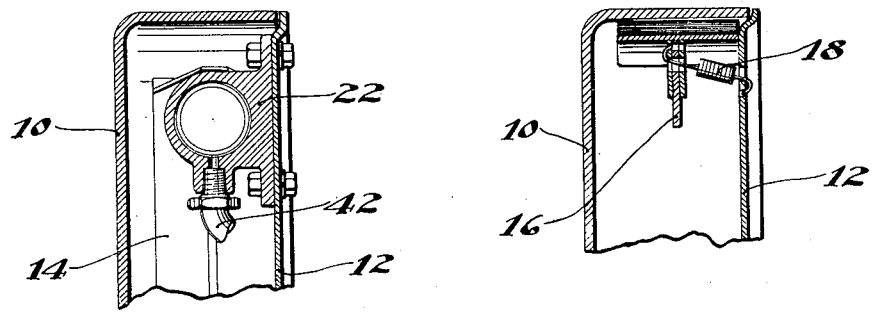
Figure 3 is a section on the line 3—3 of Figure 1, showing a steady rest.

The illustrated brake comprises a rotatable drum 10, at the open side of which is a support such as a backing plate 12, and within which is arranged the friction means of the brake. The friction means illustrated includes a pair of floating shoes 14 and 16, each arranged to anchor at one end when the drum 10 is turning in one direction and to anchor at the other end when the drum is turning in the other direction. The shoes are provided with suitable spring steady rests 18, and are shown with return springs 20 tensioned between them. The spring steady rests 18 are illustrated most clearly in Figure 3 and each comprises a tension spring connected at one end to the shoe 16 or 14 and at the opposite end to the backing plate 12. These springs extend diagonally and serve normally to urge the shoes radially inward away from contact with the drum and to position the shoes laterally in contact with the backing plate.

According to an important feature of the present invention, novel fluid-pressure applying devices are arranged between the ends of the shoes, these devices preferably being arranged to serve as brake anchors and take the braking torque of the shoes.

In their illustrated form these devices include cylinders 22 and 24, shown secured to the backing plate by four bolts each, each containing a pair of pistons 26 provided with piston rods 28 shouldered to form heads 30 in thrust engagement with the ends of the shoes. The heads 30 are also adapted for anchoring engagement with caps 32 forming the ends of the cylinder. These caps are suitably vented at 34.

In operation the pistons 26 spread the shoes apart, and the heel ends of the shoes anchor in sliding engagement with the rounded heads 30 which in turn anchor on the cylinder.

The usual hydraulic line on the chassis may be connected to a fitting 40 on the backing plate, from which branches 42 lead to inlets between the pistons 26 in the two cylinders 22 and 24.

While one illustrative embodiment has been described in detail, it is not my intention to limit the scope of the invention to that particular embodiment, or otherwise than by the terms of the appended claims.

I claim:

1. A brake comprising a pair of shoes, a pair of cylinders between the ends of the shoes, and a pair of pistons in each cylinder arranged to act on the adjacent shoe ends and each formed with a part shouldered for anchoring engagement with the end of the cylinder.

2. A brake comprising a pair of floating shoes, a fluid pressure actuating device between the pair of adjacent ends of said shoes and disconnectedly engaging said ends of the shoes, and another fluid pressure actuating device between the opposite adjacent ends of the shoes, also disconnectedly engaging said opposite ends of the shoes.

3. A brake comprising a pair of individually shiftable shoes each adapted to anchor separately on either end, a fluid pressure actuating device mounted between each pair of adjacent ends of said shoes, and means whereby the shoes may anchor individually upon either fluid pressure device without transmitting the anchoring torque to the applying fluid.

4. A brake utilizing fluid under pressure for transmission of brake power comprising a pair of shoes, a pair of cylinders between the ends of the shoes, means for transmitting the braking torque of the shoes to the cylinder without transmitting said full braking torque to the fluid, and a pair pistons in each cylinder arranged to transmit force to the adjacent shoe ends.

5. A brake utilizing fluid under pressure for transmission of braking force comprising a pair of shoes, a pair of cylinders between the ends of the shoes, a pair of pistons in each cylinder arranged to transmit force to the adjacent shoe ends, and means for transmitting the braking torque of the shoes to the cylinders without transmitting said braking torque to the fluid in the cylinders.

6. A brake utilizing fluid under pressure in the actuation thereof comprising a pair of shoes, a pair of cylinders between the ends of the shoes, and means comprising a pair of pistons in each cylinder and piston rods associated therewith transmitting applying force to the adjacent shoe ends and for transmitting the braking torque from the shoe ends to the cylinder without transmitting said braking torque to the actuating fluid.

7. A brake comprising a pair of shoes, a pair of cylinders between the ends of the shoes arranged to take the braking torque of the shoes, and means comprising a pair of pistons in each cylinder and piston rods associated therewith for transmitting applying force to the adjacent shoe ends and for transmitting the braking torque from the adjacent shoe ends to the cylinder.

8. A brake comprising a pair of shoes, a pair of cylinders between the ends of the shoes arranged to take the braking torque of the shoes, and means comprising a piston in each cylinder and a piston rod associated therewith for transmitting applying force to the adjacent shoe end to apply the shoe and for transmitting the braking torque from said shoe end to the cylinder.

9. A brake comprising a pair of shoes, a pair of cylinders arranged between the ends of the shoes, and means comprising a pair of pistons in each cylinder each provided with a part shouldered for engagement with the end of the cylinder for acting on the adjacent shoe ends to apply the shoes and for anchoring the shoes to take the braking torque.

ADIEL Y. DODGE.